United States Patent [19]
Sato et al.

[11] Patent Number: 6,074,319
[45] Date of Patent: Jun. 13, 2000

[54] RATIO CHANGE CONTROL SYSTEM FOR MULTIPLE RATIO TRANSMISSION

[75] Inventors: Osamu Sato; Akihiro Ueki, both of Kanagawa, Japan

[73] Assignee: Nissan Motor Co., Ltd, Yokohama, Japan

[21] Appl. No.: 09/253,056

[22] Filed: Feb. 19, 1999

[30] Foreign Application Priority Data

Feb. 19, 1998 [JP] Japan ................................. 10-037033

[51] Int. Cl.⁷ ................................................ F16H 61/06
[52] U.S. Cl. .......................................... 475/120; 475/123
[58] Field of Search .................... 475/120, 123, 475/129

[56] References Cited

U.S. PATENT DOCUMENTS

| | | | |
|---|---|---|---|
| 4,680,992 | 7/1987 | Hayasaki et al. | 74/869 |
| 4,709,596 | 12/1987 | Boda | 74/868 |
| 4,754,403 | 6/1988 | Hiramatsu | 475/120 |
| 5,758,302 | 5/1998 | Schulz et al. | 701/51 |
| 5,772,550 | 6/1998 | Kamada et al. | 475/120 |
| 5,899,831 | 5/1999 | Takiguchi | 477/151 |

FOREIGN PATENT DOCUMENTS 6-58145   8/1994   Japan.

*Primary Examiner*—Dirk Wright
*Attorney, Agent, or Firm*—Foley & Lardner

[57] ABSTRACT

An automatic control system for a multiple ratio transmission includes an electronically controlled variable orifice configuration within a discharge circuit for a downshift control system from a high speed ratio to an intermediate speed ratio. The variable orifice configuration divides the discharge circuit into an upstream part communicating with an accumulator chamber of an accumulator and an intermediate brake release pressure chamber defined by a double acting piston of an intermediate ratio brake servo, and a downstream part communicating with a high speed ratio clutch. A calibrated flow control orifice is disposed in the discharge circuit to control discharge flow of oil from said downstream part. A transmission controller reduces the variable orifice configuration to provide a reduced orifice size during inertia phase of the downshift.

17 Claims, 13 Drawing Sheets

FIG.4 (INTERMEDIATE STAGE 1)

FIG.5 (INTERMEDIATE STAGE 2)

FIG.6 (INTERMEDIATE STAGE 3)

RATIO CHANGE CONTROL SYSTEM FOR MULTIPLE RATIO TRANSMISSION

FIELD OF THE INVENTION

The present invention relates to multiple ratio transmissions and more particularly to electronic-hydraulic controls for effecting automatic ratio changes.

BACKGROUND OF THE INVENTION

The present invention is adapted to be used in a multiple ratio transmission situated in a vehicle drive line having an internal combustion engine and a hydraulic torque converter situated between the engine and an input shaft of the transmission.

A multiple ratio transmission is described in "RE4R01A TYPE AUTOMATIC TRANSMISSION SERVICE MANUAL" issued in 1987 by the assignee. This transmission is shown in U.S. Pat. No. 4,680,992, issued Jul. 21, 1987, to Hayasaki et al. This patent is assigned to the assignee of the present invention.

This transmission comprises, as its gearing elements, two simple planetary gear units arranged between the transmission input shaft and the transmission output shaft. The two simple planetary gear units include a rear planetary gear unit and a front planetary gear unit situated between the rear planetary gear unit and a hydraulic torque converter. The rear planetary gear unit includes a rear sun gear connected to the input shaft, a rear planet carrier connected to the output shaft, and a rear ring gear. The front planetary gear unit includes a front sun gear, a front planet carrier, and a front ring gear connected to the rear planet carrier. A forward clutch interconnects a low one-way clutch and a forward one-way clutch. Upon engagement of the forward clutch, the low one-way clutch and the forward one-way clutch are brought into cooperation with each other. They overrun in the engine rotational direction and effect a torque reaction in the opposite rotational direction, thus allowing the rear planet carrier to rotate in the engine rotational direction, but preventing its rotation in the opposite rotational direction. The low one-way clutch overruns in the engine rotational direction and effects a torque reaction in the opposite rotational direction, thus allowing the front planet carrier to rotate in the engine rotational direction, but preventing its rotation in the opposite rotational direction. An intermediate ratio brake is adapted to anchor the front sun gear to establish a torque reaction flow path associated with an intermediate speed ratio (=second gear) and also an overdrive (=fourth gear). A high ratio clutch is adapted to interconnect the rear planet carrier and the input shaft. A reverse clutch is adapted to interconnect the front sun gear to the input shaft. A low reverse brake is adapted to anchor the front planet carrier. This known transmission has four speed ratios in Drive and a reverse. A low speed ratio (=first gear) in Drive is established by engagement of the forward clutch. For a shift from low speed ratio to intermediate speed ratio in Drive, the intermediate ratio brake is engaged with the forward clutch engaged. For a shift from intermediate speed ratio to a high speed ratio (=third gear) in Drive, the intermediate ratio brake is released and the high ratio clutch is engaged with the forward clutch engaged. For a shift from high speed ratio to overdrive (=fourth gear) in Drive, the intermediate ratio brake is engaged with the forward and high ratio clutch engaged. For a downshift from high speed ratio to intermediate speed ratio, the high ratio clutch is released and the intermediate ratio brake is engaged.

The intermediate ratio brake includes a fluid pressure operated intermediate servo. The intermediate servo has a double acting piston defining an intermediate brake apply pressure chamber and an intermediate brake release pressure chamber. The double acting piston has an integral auxiliary piston defining a second intermediate brake apply pressure chamber. A pressure accumulator communicates with the intermediate brake release pressure chamber and the high ratio clutch.

Ratio change between intermediate speed ratio and high ratio on an upshift is achieved by controlling pressure build-up within the intermediate brake release pressure chamber and pressure build-up within the high ratio clutch. Ratio change between the high ratio and the intermediate ratio on a downshift is achieved by controlling pressure reduction within the high ratio clutch and pressure reduction within the intermediate brake release pressure chamber.

FIG. 10 is a simplified illustration of a 3-2 downshift control system of the transmission for effecting a downshift from high speed ratio to intermediate speed ratio by controlling discharge of oil from the intermediate brake release pressure chamber and the high ratio clutch.

In response to a command for a 3-2 downshift from the high speed ratio to intermediate speed ratio, a shift solenoid triggers movement of a shift valve. This initiates discharge of oil from the intermediate brake release pressure chamber and the accumulator 323 chamber through calibrated flow control orifices 322 and 321 and discharge of oil from the high ratio clutch H/C through the calibrated control orifice 321. The intermediate brake release pressure $P_{3R}$ and the high ratio clutch apply pressure $P_{HC}$ drop at rates that are determined by the accumulator 323, the double acting piston of the intermediate servo, and the orifices 321 and 322.

FIG. 11 is a 3-2 downshift timing diagram illustrating variations of the high clutch apply pressure $P_{HC}$ and the intermediate brake release pressure $P_{3R}$ initiated by the command for a 3-2 downshift. Immediately after a drop in oil pressure at moment $t_1$, the double action piston of the intermediate brake servo begins to move in such a direction as to decrease the volume of the intermediate brake release pressure chamber. Concurrently, the piston of the accumulator 323 begins to move in such a direction as to decrease the volume of the accumulator chamber. At moment $t_2$, the double action piston comes to an end of its movement and the engagement of the brake B/B begins. During the time period $t_1$–$t_2$, the pressures $P_{3R}$ and $P_{HC}$ drop at ramp rates that are determined by the movements of the double action piston and the piston of the accumulator 323.

After the moment $t_2$, the movement of the piston of the accumulator 323 continues and the pressures $P_{3R}$ and $P_{HC}$ reduce at ramp rates that are determined by the accumulator 323. At moment $t_4$, the pressures $P_{3R}$ and $P_{HC}$ are reduced to zero.

The calibrated flow control orifice 322 has an orifice size that is unaltered over the time period $t_1$–$t_4$. This orifice size determines the apply timing of the intermediate brake B/B (at moment $t_2$).

With regard to the intermediate ratio brake B/B, its torque transmitting capacity QBB develops from the moment $t_2$ before the completion of inertia phase (at the moment $t_3$). The inertia phase is completed when engine speed Ne reaches a level corresponding to the intermediate speed ratio.

With regard to the high ratio clutch H/C, its torque transmitting capacity $Q_{HC}$ remains at a considerable level over the time period $t_2$–$t_3$, resulting in creation of interlocking tendency of the high ratio clutch H/C and the intermediate brake B/B. This explains an increased rate at which the transmission output shaft torque $T_o$ drops over the time period $t_2$–$t_3$, as illustrated within a portion encircled by a phantom line circle α1. This causes increased torque disturbance.

At the moment $t_2$, the torque transmitting capacity $Q_{HC}$ drops down to a level, which is too low to hold dragging force through the high clutch H/C at a sufficiently high level Thus, the dragging force is not strong enough to suppress the magnitude of an increase, as illustrated within a portion encircled by a phantom line circle β1, in transmission output torque To that occurs at the moment $t_3$. The reduction of magnitude of this increase in transmission output shaft torque is needed to improve shift feel at the moment $t_3$.

U.S. Pat. No. 4,709,596 (≠JP-B 6-58145) teaches independent discharge circuits for a high ratio clutch and an intermediate brake for a downshift control system from a high ratio to an intermediate ratio. The discharge circuit for an intermediate ratio brake includes a timing valve. This known control strategy is described along with FIG. 12.

FIG. 12 is a 3-2 downshift timing diagram illustrating variations of the torque transmitting capacity $Q_3$ of the high ratio clutch and the torque transmitting capacity $Q_2$ of the intermediate ratio brake. The known control strategy aims at rapid increase of the torque transmitting capacity $Q_3$ of the intermediate ratio brake, at moment $t_3$, upon the completion of inertia phase. To accomplish this aim, it is proposed to open the timing valve at a moment $t_v$ before the moment $t_3$ by a time interval Δt, to increase apply rate of the intermediate brake. This is effective in eliminating the interlocking tendency, thus eliminating rapid drop of transmission output torque near the completion of inertia phase. However, this known control strategy fails to suppress the magnitude of increase β1 in transmission output torque To that takes place upon the completion of inertia phase (at moment $t_3$).

SUMMARY OF THE INVENTION

Accordingly, the present invention aims at optimizing the profile of transmission output shaft torque during inertia phase of a downshift as well as shortening the time required for the inertia phase, thereby to shorten the overall time required for the downshift.

According to one aspect of the present invention, there is provided an automatic control system for a multiple ratio transmission in a vehicle drive line having an internal combustion engine and a hydraulic torque converter situated between the engine and an input shaft of the transmission, the transmission having a low speed ratio, an intermediate speed ratio and a high speed ratio, the automatic control system comprising:

a high speed ratio clutch connecting two torque delivery elements of the transmission to establish the high speed ratio;

an intermediate speed ratio brake providing a reaction element of the transmission to establish the intermediate speed ratio;

said intermediate speed ratio brake including a fluid pressure operated intermediate brake servo having a double acting piston defining an intermediate brake apply pressure chamber and an intermediate brake release pressure chamber;

a fluid pressure pump;

a regulator valve regulating pressure from said pump to establish line pressure;

an accumulator including an accumulator piston defining an accumulator chamber communicating with said intermediate brake release pressure chamber and said high ratio clutch;

a first shift configuration selectively distributing said line pressure to said intermediate brake apply pressure chamber;

a second shift configuration selectively distributing said line pressure to said intermediate brake release pressure chamber and said high ratio clutch, a discharge circuit being responsive to the command for a downshift from the high speed ratio to the intermediate speed ratio to allow discharge oil from said intermediate brake release pressure chamber, said high ratio clutch and said accumulator chamber;

a variable orifice configuration fluidly disposed in said discharge circuit to divide said discharge circuit into an upstream part, with respect to discharge flow of oil through said discharge circuit, communicating with said accumulator chamber and said intermediate brake release pressure chamber and a downstream part communicating with said high ratio clutch, said variable orifice configuration providing different orifice sizes to control discharge flow of oil from said upstream part to said downstream part;

a first calibrated flow control orifice fluidly disposed in said discharge circuit to control discharge flow of oil from said downstream part; and a transmission controller being operative in response to the command for a downshift from the high speed ratio to the intermediate speed ratio to reduce said variable orifice configuration to provide a reduced orifice size during inertia phase of the downshift.

The transmission controller restores said variable flow orifice configuration to provide an unreduced orifice size upon the completion of inertia phase. This control strategy is effective in suppressing an increase in transmission output shaft torque that takes place upon the completion of inertia phase.

According to another aspect of the present invention, there is provided an automatic control system for a multiple ratio transmission in a vehicle drive line having an internal combustion engine and a hydraulic torque converter situated between the engine and an input shaft of the transmission, the transmission having a low speed ratio, an intermediate speed ratio and a high speed ratio, the automatic control system comprising:

a high speed ratio clutch connecting two torque delivery elements of the transmission to establish the high speed ratio;

an intermediate speed ratio brake providing a reaction element of the transmission to establish the intermediate speed ratio;

said intermediate speed ratio brake including a fluid pressure operated intermediate brake servo having a double acting piston defining an intermediate brake apply pressure chamber and an intermediate brake release pressure chamber;

a fluid pressure pump;

a regulator valve regulating pressure from said pump to establish line pressure;

an accumulator including an accumulator piston defining an accumulator chamber communicating with said intermediate brake release pressure chamber and said high ratio clutch;

a first shift configuration selectively distributing said line pressure to said intermediate brake apply pressure chamber;

a second shift configuration selectively distributing said line pressure to said intermediate brake release pressure chamber and said high ratio clutch, a discharge circuit being responsive to the command for a downshift from the high speed ratio to the intermediate speed ratio to allow discharge oil from said intermediate brake release pressure chamber, said high ratio clutch and said accumulator chamber;

a variable orifice configuration fluidly disposed in said discharge circuit to divide said discharge circuit into an upstream part, with respect to discharge flow of oil through said discharge circuit, communicating with said accumulator chamber and said intermediate brake release pressure chamber and a downstream part communicating with said high ratio clutch, said variable orifice configuration providing different orifice sizes to control discharge flow of oil from said upstream part to said downstream part;

a first calibrated flow control orifice fluidly disposed in said discharge circuit to control discharge flow of oil from said downstream part; and a transmission controller being operative in response to the command for a downshift from the high speed ratio to the intermediate speed ratio to control said variable orifice configuration to establish a first intermediate stage until the initiation of inertia phase in which said variable orifice configuration provides an unreduced orifice size that is greater than the orifice size of said first calibrated flow control orifice, said transmission controller being operative to establish a second intermediate stage after the initiation of inertia phase until the completion of inertia phase in which said variable orifice configuration provides a reduced orifice size, said transmission controller being operative to establish a third intermediate stage upon the completion of inertia phase in which said variable orifice configuration provides the unreduced orifice size.

DESCRIPTION OF THE PREFERRED EMBODIMENTS

Referring to the accompanying drawings, FIGS. 1A–1C, 2 and 3 illustrate the hardware of the preferred implementation of the present invention. The hardware illustrated in these Figures are substantially the same as that illustrated in FIGS. 1A–1C, 2 and 3 of the before listed U.S. Pat. No. 4,680,992 (Hayasaki et al.), which patent has been hereby incorporated herein by reference in its descriptive portions of FIGS. 1A–1C, 2 and 3. Thus, for understanding the detail of the hardware illustrated in FIGS. 1A–1C, 2 and 3 of this application, reference is made to the incorporated U.S. Pat. No. 4,680,992.

Transmission Electronic-Hydraulic Control

Figure 1A:
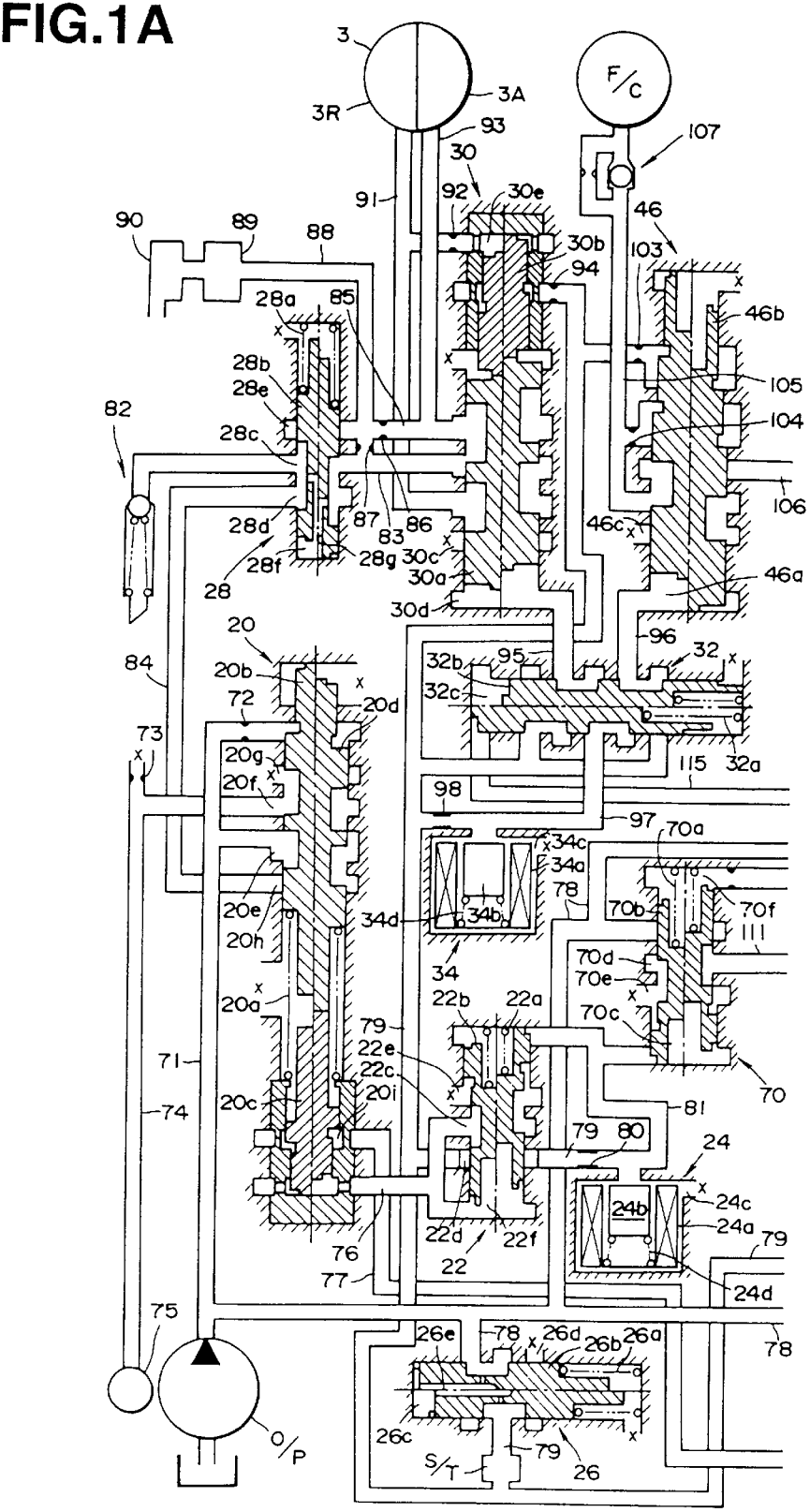
FIGS. 1A, 1B and 1C, when arranged side by side, illustrate a hydraulic control unit of an electronic-hydraulic control system for a multiple ratio transmission.
Figure 1B:
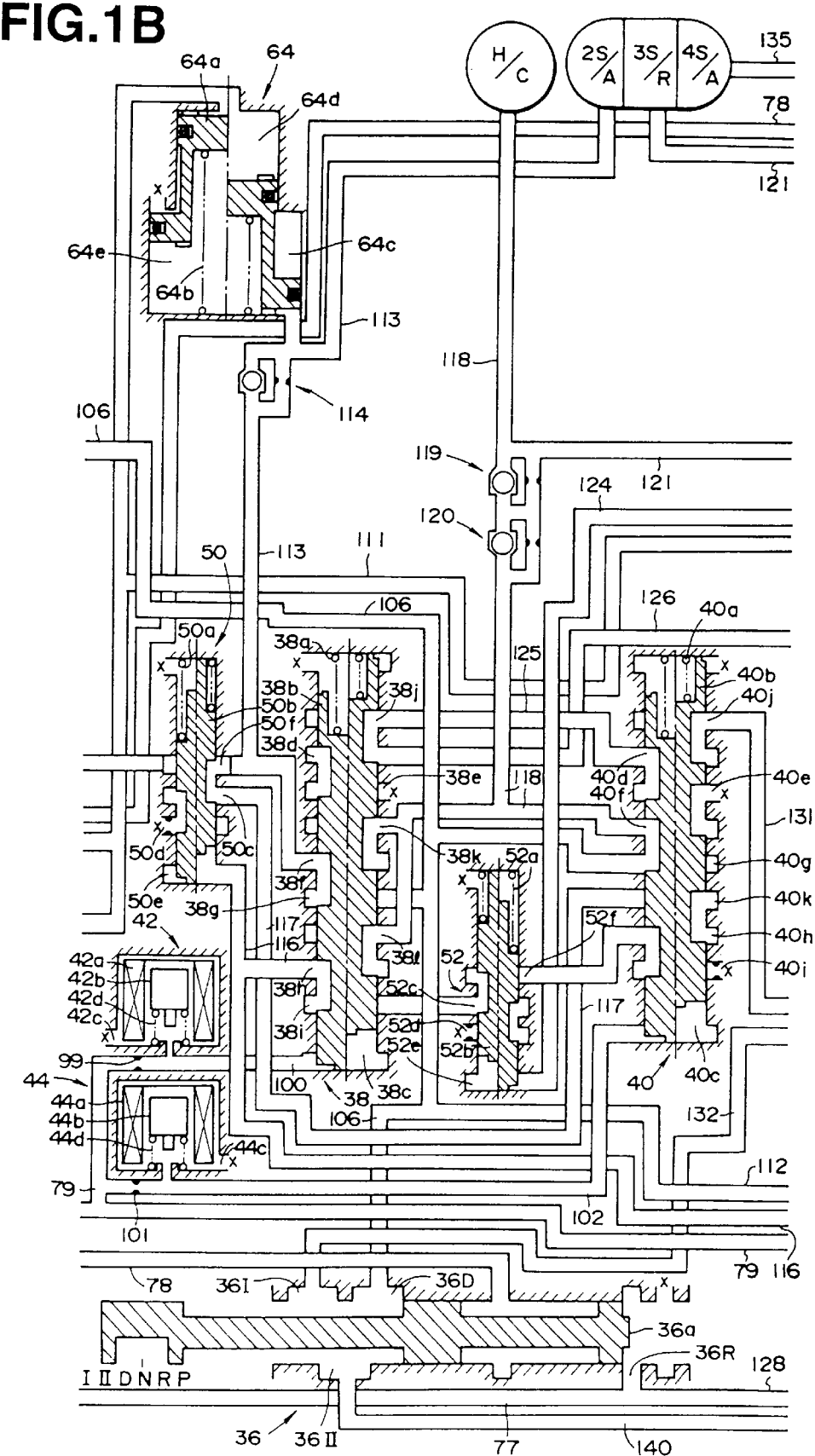
Figure 1C:
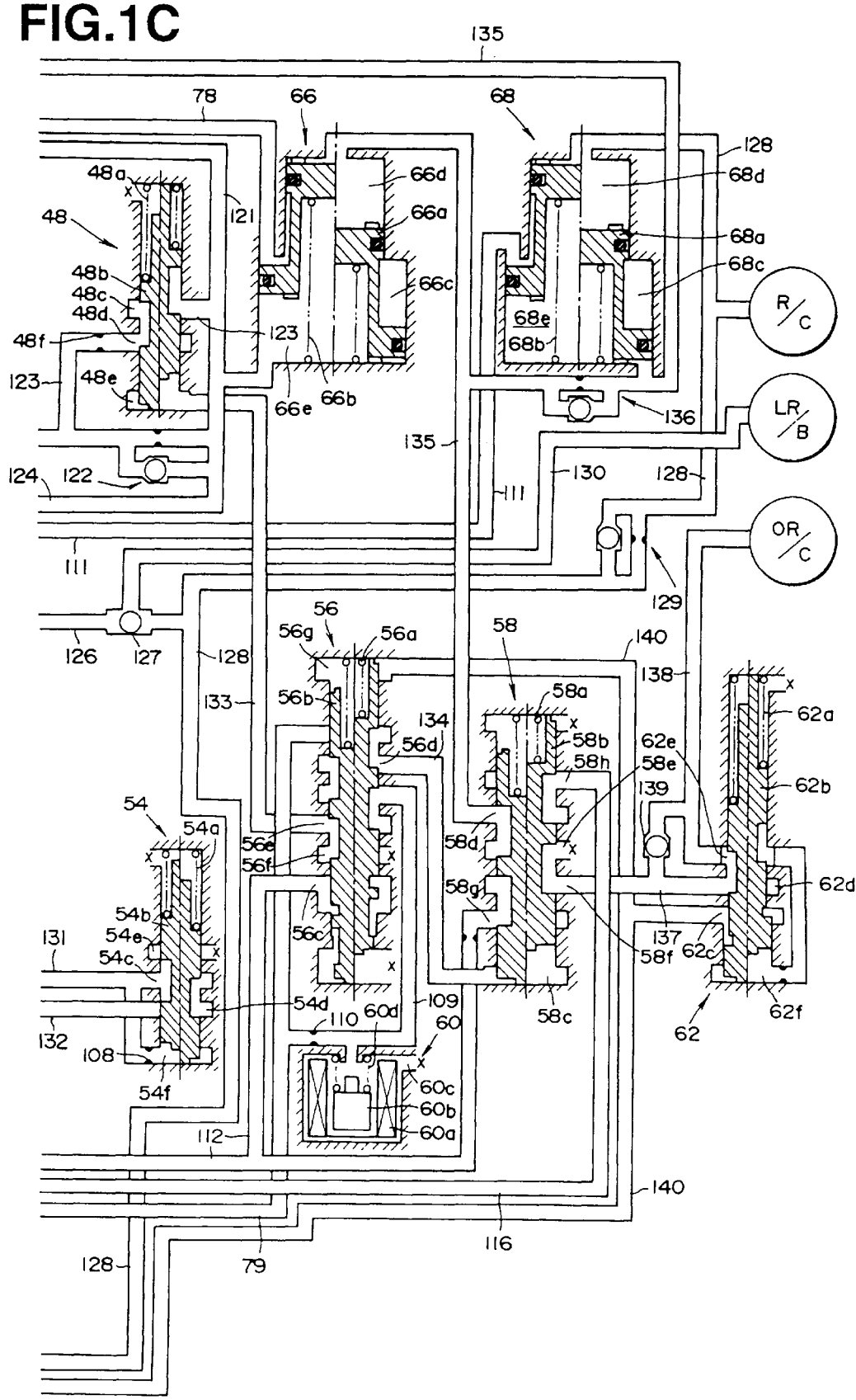

The electronic-hydraulic control system for the transmission is a hybrid system wherein solenoids, actuated by a microprocessor based transmission controller, control gear selection, converter lock-up clutch operation and system pressure (line pressure) buildup. The friction elements (band brakes and clutches) are applied and released by hydraulic pressure determined by a hydraulic control unit. As shown in FIGS. 1A–1C, the hydraulic control unit includes two shift solenoids 42, 44, two shift valves 38, 40, a duty solenoid 24 for system pressure buildup, a duty solenoid 34 for converter lock-up clutch operation, a 3-2 timing valve 48, an accumulator 66 and a solenoid 48 for controlling the 3-2 timing valve 48.

The transmission control strategy is based on various signal inputs generated from the driver, engine and transmission, for each operating condition. Signals used during execution of the transmission control strategy include engine speed Ne, vehicle speed VSP and throttle opening degree (or throttle position) TH.

Transmission Torque Flow

Figure 2:
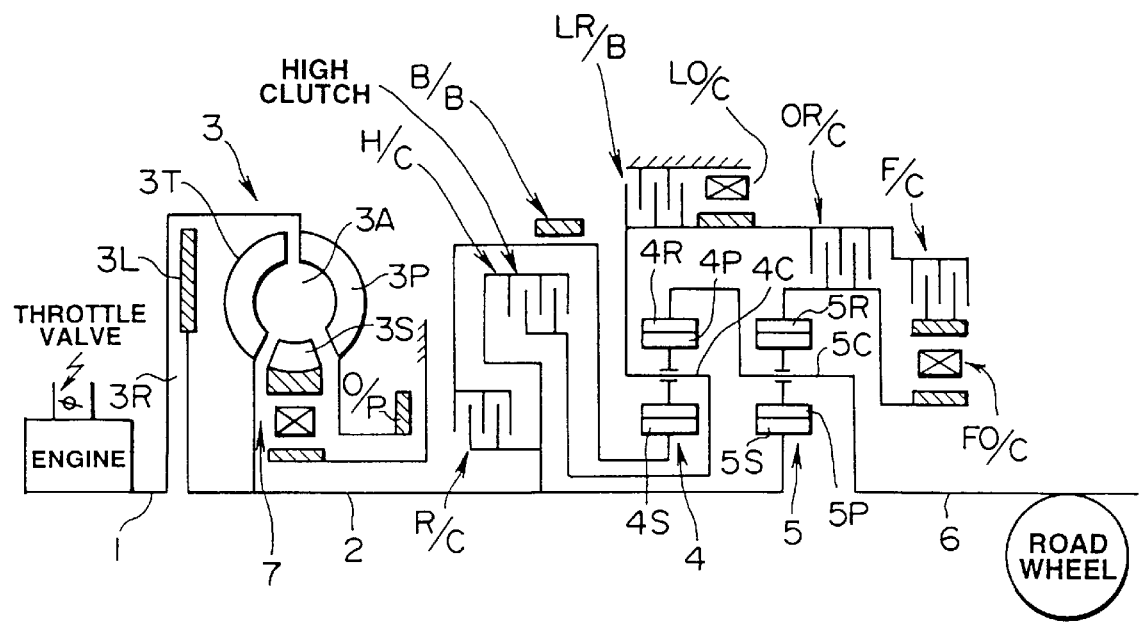
FIG. 2 is a schematic illustration of gearing elements of the multiple ratio transmission.

FIG. 2 shows, in schematic form, the torque flow paths for the transmission. The clutch and brake engagement and release pattern to effect ratio changes in Drive range is as follows:

For first gear (low speed ratio), a forward clutch F/C is engaged. For second gear (intermediate speed ratio), an intermediate brake B/B is applied with the forward clutch F/C engaged. For third gear (high speed ratio or direct drive), the intermediate brake B/B is released and a high ratio clutch H/C is engaged with the forward clutch engaged. For fourth gear (overdrive), the intermediate brake B/B is applied with both the high ratio and forward clutches engaged.

Torque Flow First Gear (Low Speed Ratio) in Drive

The engine torque is transmitted to the housing of a torque converter pump or impeller 3P. The converter impeller 3P is a centrifugal pump, which accelerates the oil inside of the torque converter towards turbine blades 3T. The accelerated oil is then decelerated over the turbine blades 3T and the oil at the turbine exit is redirected over the stator or reactor 3S into the impeller 3P, thereby achieving a torque multiplication effect.

From a transmission input shaft or turbine shaft 2, the torque is transmitted to a sun gear 5S of a planetary gear unit 5. A ring gear 5R of this planetary gear unit 5 is held by a forward one-way clutch FOIC that is held by a low one-way clutch LO/C via the forward clutch F/C. The forward one-way clutch FO/C and low one-way clutch LO/C overrun in the rotational direction of the engine and effects a toque reaction in the opposite rotational direction. The torque delivered to the sun gear 5S is then transmitted to a planet carrier 5C and to an output shaft 6.

In coast mode, the forward one-way clutch FO/C and low one-way clutch LO/C overrun and free wheeling takes place.

Torque Flow Second Gear (Intermediate Speed Ratio) in Drive

The torque flow is the same as in the first gear except that the intermediate brake B/B is applied. With the engagement of the brake B/B, the speed of a sun gear 4S of a planetary gear unit 4 is reduced to zero. Here, a band 13 (see FIG. 3) of the brake B/B serves as a reaction element for the planetary gear unit 4. The forward one-way clutch FO/C and low one-way clutch LO/C overrun.

Torque Flow Third Gear (High Speed Ratio) in Drive

In third gear, the intermediate brake B/B is released and the high ratio clutch H/C is applied. This is the direct drive with a gear ratio of one. The transition from a downshift from the third gear to second gear has to be synchronized. Control effort is implemented for this shift as will be explained subsequently.

Torque Flow Fourth Gear (Overdrive) in Drive

In fourth gear, the intermediate brake B/B is applied. Since the brake B/B reduces the speed of the sun gear 4S to zero, this arrangement provides a gear ratio less than one.

Figure 3:
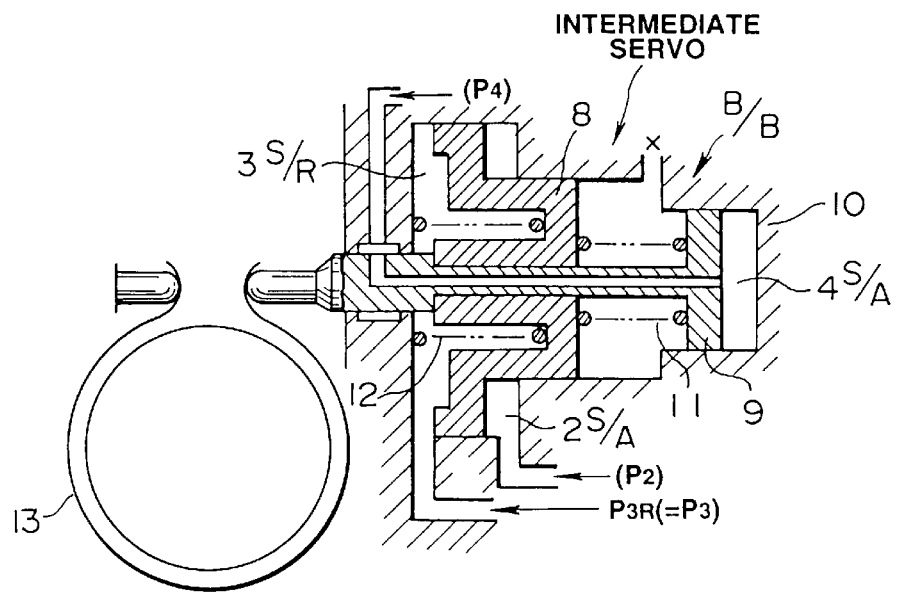
FIG. 3 is a schematic illustration of an intermediate brake servo for an intermediate ratio brake.

FIG. 3 illustrates an intermediate servo for the brake B/B. The intermediate servo includes a double action piston 8 defining a serve apply pressure chamber 2S/A and a servo release pressure chamber 3S/R.

Line Pressure Generating System

The hydraulic system shown in FIGS. 1A–1C includes an oil pump O/P, a regulator valve 20, a pilot valve 26, a line pressure solenoid 24, and a pressure modifier valve 22. A transmission controller inputs information of the engine throttle position or opening degree from a throttle sensor. The pilot valve 26 generates a constant pressure designated as a pilot pressure. The pilot pressure is distributed to the line pressure solenoid 24 and to the pressure modifier valve 22. The duty of the line pressure solenoid 24 is adjustable in response to a control signal. The transmission controller develops the control signal in a manner determined as one of selectable functions of the engine output torque. Regulated pressure of the line pressure solenoid 24, designated as a throttle pressure, is applied to the pressure modifier valve 22. The pressure modifier valve 22 uses the pilot pressure as an input pressure and the throttle pressure as a signal pressure in generating a hydraulic pressure, designated as a pressure modifier pressure. The profile of the pressure modifier pressure approximates the profile of the engine torque against the throttle opening degrees. The pressure modifier pressure is applied to the regulator valve 20. The regulator valve 20 effects regulation of oil discharged by the oil pump O/P in response to the pressure modifier pressure to generate a line pressure. The line pressure that is variable with the engine torque is always distributed to a servo release pressure accumulator 66 through a circuit 78. An accumulator piston 66a is always subjected to the line pressure and urged to move in such a direction as to compress in volume of an accumulator chamber 66e. The accumulator chamber 66e is in communication with a servo release pressure chamber 3S/R of an intermediate servo of an intermediate ratio band brake B/B. In intermediate speed ratio and high speed ratio, the line pressure is distributed, as a second speed pressure $P_2$, to the intermediate brake servo through a first shift configuration. The first shift configuration includes a first shift valve 38 and a first shift solenoid 42. The line pressure is applied to an apply side of a piston 8 of the intermediate brake servo. In the high speed ratio, the line pressure is distributed to a high ratio clutch H/C and also to the intermediate servo through a second shift configuration. The line pressure is applied, as a high clutch pressure $P_{HC}$, to a servo piston of the high ratio clutch H/C and, as an intermediate brake release pressure $P_{3R}$, to the intermediate brake release pressure chamber 3S/R. A release side of the piston 8 of the intermediate servo is subjected to the line pressure. The second shift configuration includes a second shift valve 40 and a second shift solenoid 44. The first and second shift solenoids 42 and 44 are activated or deactivated in response to control signals from the transmission controller.

3-2 Downshift Control System

The transmission includes three solenoid stages designated as first, second and third intermediate stages 1, 2 and 3 between high speed ratio (=3rd gear) and intermediate ratio (=2nd gear). The accumulator 66, the intermediate servo, a variable orifice configuration and a fixed calibrated orifice 120 achieve the three intermediate stages 1, 2 and 3.

The high ratio clutch H/C and the intermediate servo release pressure chamber 3S/R are exhausted through the second shift configuration during 3-2 downshift using the three intermediate stages 1, 2 and 3 following the command for a 3-2 downshift until the completion of the downshift. Desired capacity requirement is achieved on the high ratio clutch H/C with the intermediate servo release pressure controlled using the two intermediate stages 1 and 2 following the 3-2 downshift command until the completion of inertia phase to shorten the inertia phase. This is done by exhausting oil from the high clutch H/C, the intermediate servo release pressure chamber 3S/R and the accumulator chamber 66e through a calibrated flow control orifice 120 during the intermediate stage 1 following the downshift command until the initiation of the inertia phase. During the intermediate stage 2 (see FIG. 5) until the completion of the inertia phase, a variable orifice configuration with a reduced orifice size is fluidly disposed downstream with respect to flow of oil exhausted from the intermediate servo release pressure chamber 3S/R and the accumulator chamber 66e. The variable orifice configuration is connected in series with the calibrated flow control orifice 120 and disposed upstream of the calibrated flow control orifice 120 with respect to flow of the exhausted oil during the downshift. The high clutch H/C is connected to the 3-2 downshift control system at a middle point between the variable orifice configuration and the calibrated flow control orifice 120. Desired capacity requirement is achieved on the high clutch H/C and desired capacity requirement is achieved on the intermediate brake B/B using the intermediate stage 3 following the completion of the inertia phase until the completion of the downshift. The variable orifice configuration is restored to an unreduced orifice size during the intermediate stage 3 (see FIG. 6) to cause the high clutch H/C to drag.

The variable orifice configuration includes a set of parallel calibrated flow control orifices (122, 48f), a timing valve 48, and a solenoid 60. This solenoid 60 is activated or deactivated in response to a control signal generated by the transmission controller. The pilot pressure is distributed to this solenoid 60. With the solenoid 60 deactivated (OFF state), oil is left exhausted via a port 48e and a drain port 60c from a pressure chamber of the timing valve 48, leaving the calibrated flow control orifice 48f open to allow the passage of the exhausted oil during the downshift. When the solenoid 60 is activated (ON state), the pilot pressure is established in the pressure chamber of the timing valve 48, moving a spool 48b against a spring 48a to a position opening the calibrated flow control orifice 48f. The variable orifice configuration provides an unreduced orifice size when the solenoid 60 assumes OFF state and a reduced orifice size when the solenoid 60 assumes ON state.

The unreduced orifice size of the variable orifice configuration is the sum of orifice sizes of the orifices 122 and 48f. The reduced orifice size of the variable orifice configuration is equal to orifice size of the orifice 122.

The orifice size of the calibrated flow control orifice 120 is less than the unreduced orifice size of the variable orifice configuration. In the variable orifice configuration, the orifice size of the orifice 122 is less than that of the orifice 48f.

Figure 4:
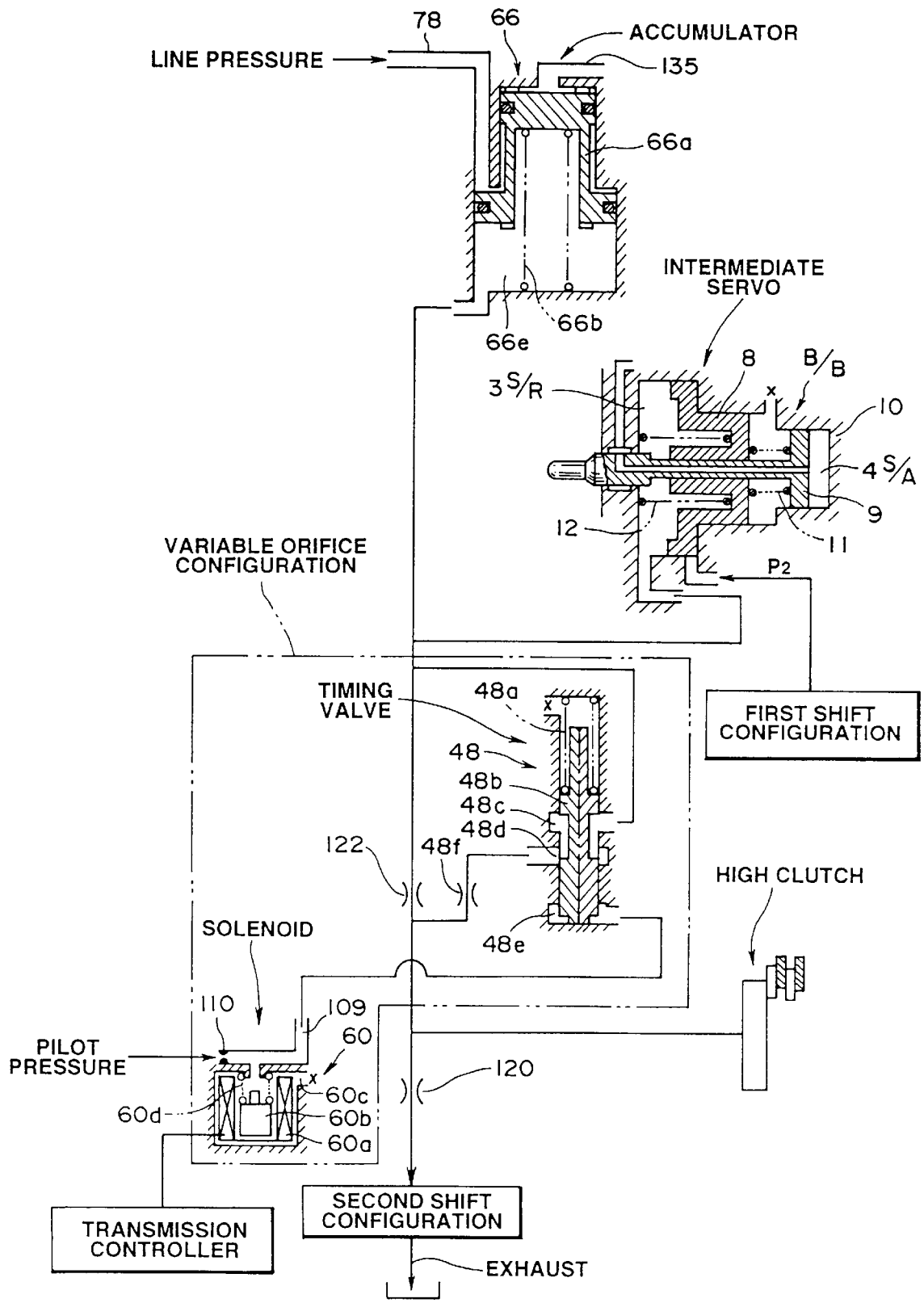
FIGS. 4, 5 and 6 illustrate three intermediate stages of a simplified illustration of a 3-2 downshift control system from high ratio to intermediate ratio.
Figure 5:
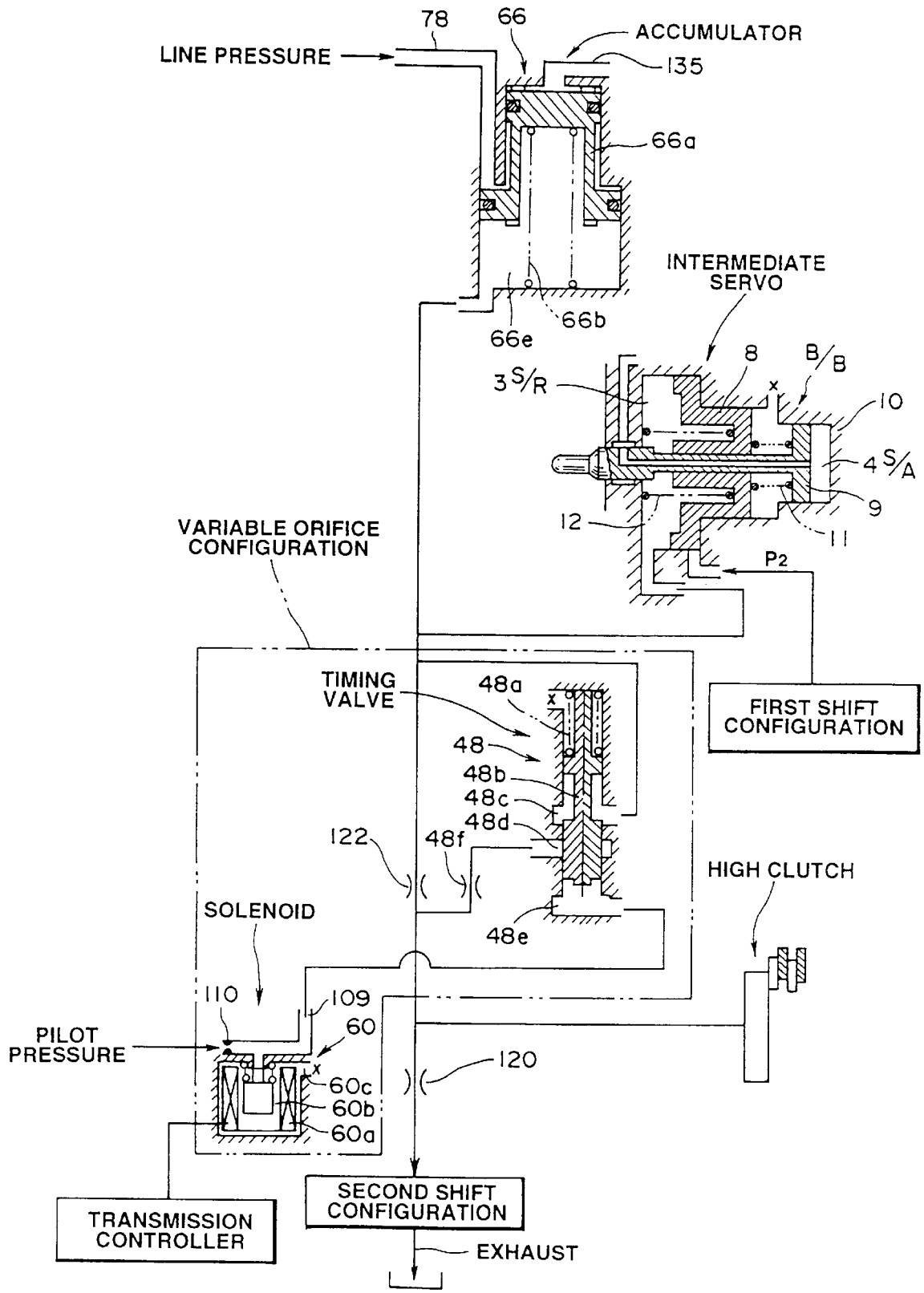
Figure 6:
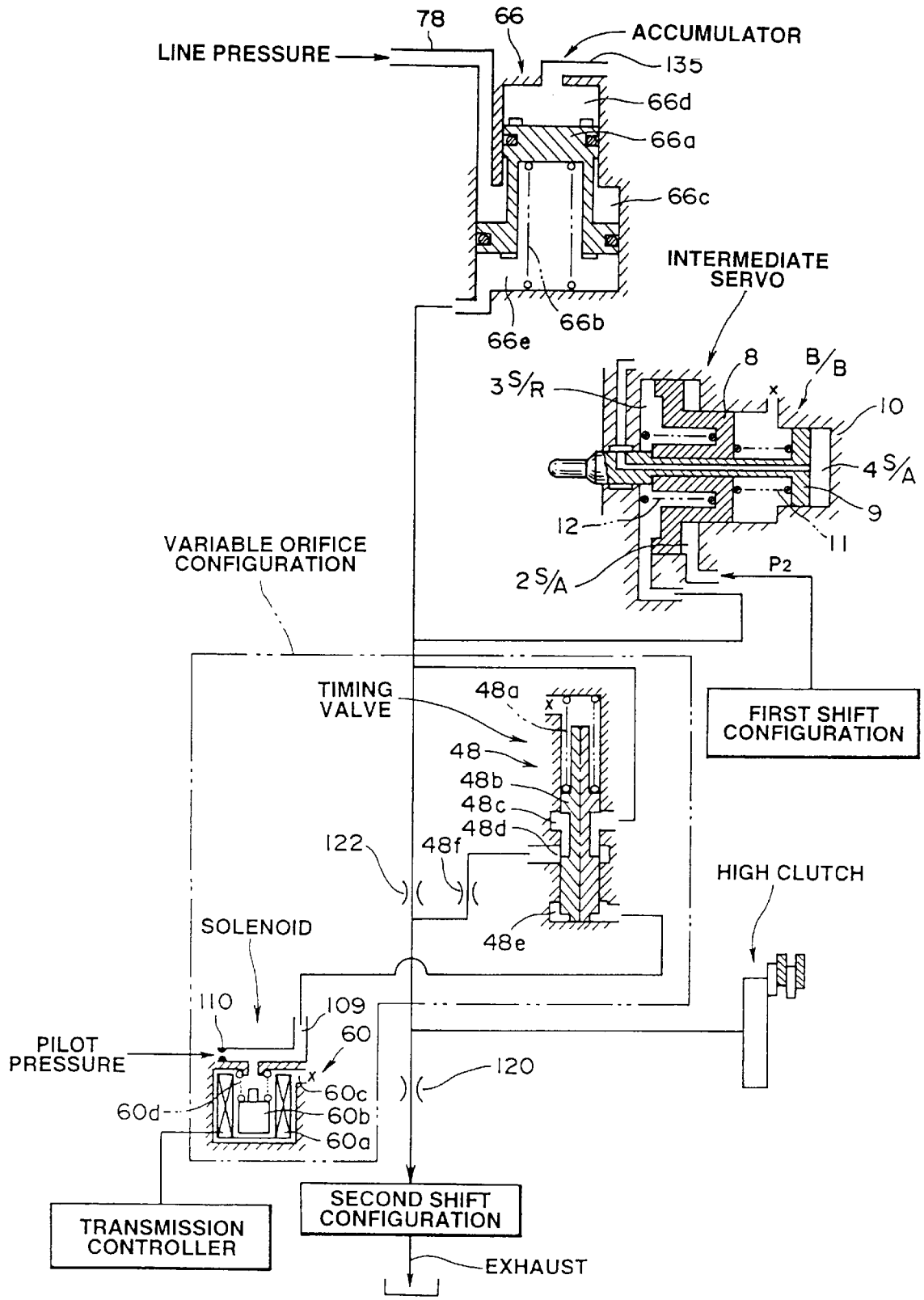

The intermediate stages 1, 2 and 3 are specifically explained along with FIGS. 4, 5 and 6, each of which illustrates the 3-2 downshift control system in a very simplified manner.

FIG. 4 illustrates the position of accumulator piston 66e, intermediate servo piston 8, timing valve spool 48b and solenoid 60 at the initiation of the intermediate state 1. The intermediate stage 1 is initiated at a moment to by the command for a 3-2 downshift and completed at a moment $t_1$ when the high clutch pressure $P_{HC}$ within the high clutch H/C has dropped to a level low enough to initiate inertia phase. During this period between $t_0$ and $t_1$, the intermediate servo release pressure $P_{3R}$ drops in magnitude at the same rate as the high clutch pressure $P_{HC}$ does because the unreduced orifice size of the variable orifice configuration is greater than the orifice size of the calibrated flow control orifice 120.

FIG. 5 illustrates the position of accumulator piston 66a, intermediate servo piston 8, timing valve spool 48b and solenoid 60 at the initiation of the intermediate stage 2. Upon or immediately after the moment $t_1$, the intermediate stage 2 is initiated by activating the solenoid 60 to close the orifice 48f, thereby to reduce the variable orifice configuration to the reduced orifice size. At the beginning of this intermediate stage 2, the intermediate servo release pressure $P_{3R}$ drops at a rate slower than the high clutch pressure $P_{HC}$ does until the accumulator piston 66a and the intermediate servo piston 8 begin to move. While the accumulator piston 66a and the intermediate servo piston 8 are moving against an accumulator spring 66b and a servo piston spring 12, respectively, the intermediate servo release pressure $P_{3R}$ and the high clutch pressure $P_{HC}$ drop at first and second servo piston and accumulator dependent ramp rates, respectively. The accumulator piston 66a, spring 66b, servo piston 8, spring 12, and the reduced orifice size of the variable orifice configuration determine the first servo piston and accumulator ramp rate. The second servo piston and accumulator dependent ramp is generally the same as the first servo piston and accumulator dependent ramp. The intermediate stage 2 is completed at a moment $t_3$ upon completion of the inertia phase. The setting should be such that the servo piston 8 comes to an end of its brake application movement upon completion of the inertia phase.

Figure 9:
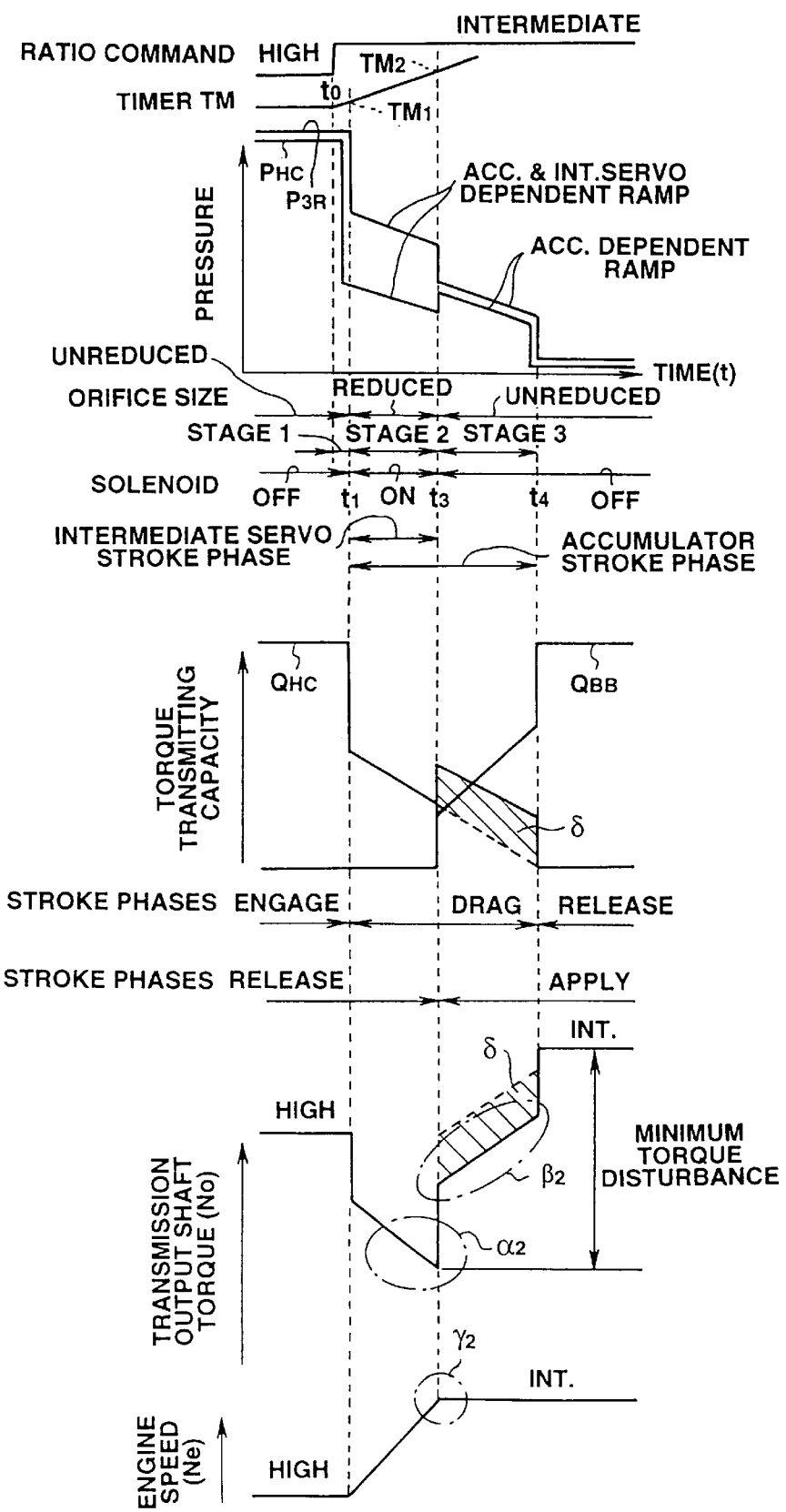
FIG. 9 illustrates a 3-2 downshift timing diagram.
Figure 10:
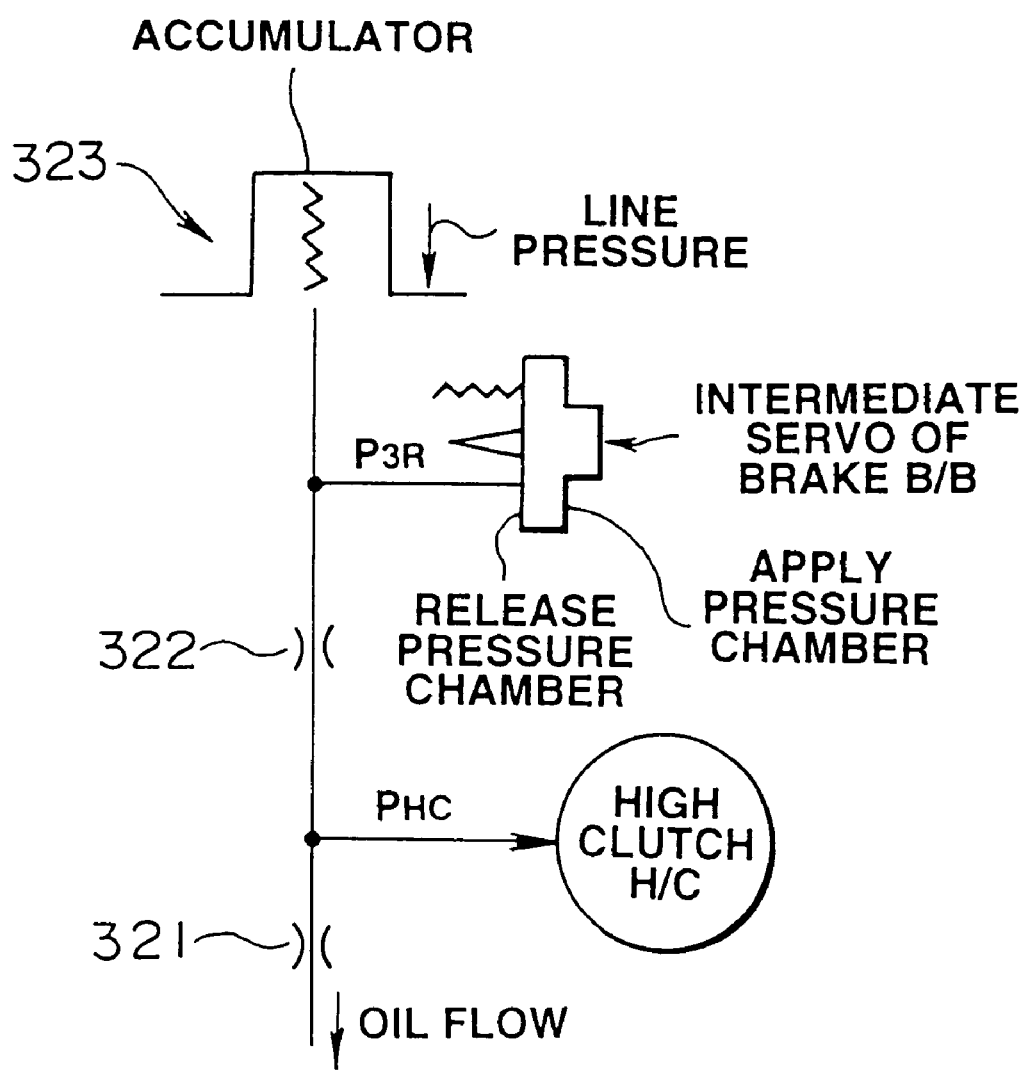
FIG. 10 is a simplified illustration of the previously discussed known 3-2 downshift control system.

FIG. 9 illustrates the profile of the intermediate servo release pressure $P_{3R}$ and that of the high clutch pressure $P_{HC}$ over the three intermediate stages 1, 2 and 3 following the command for 3-2 downshift until the completion of the shift. From the profile of pressure $P_{3R}$ over the intermediate stages 1 and 2, the magnitude of the initial pressure drop and the subsequent drop at the servo piston and accumulator ramp rate determine a moment when the servo piston 8 comes to an end of its brake application stroke. Comparing the profile of pressure $P_{HC}$ with the profile of pressure $P_{3R}$ over the intermediate stages 1 and 2 clearly reveals that the initial pressure drop of pressure $P_{HC}$ is deeper than that of pressure $P_{3R}$. This difference is caused by reduction of the orifice size of the variable orifice configuration immediately before or upon initiation of movement of the servo piston 8 and the accumulator piston 66a. The initial drop of the high clutch pressure $P_{HC}$ determines an initial reduction of torque transmitting capacity $Q_{HC}$ of the high clutch H/C. The faster the pressure $P_{HC}$ drops, the quicker the torque transmitting capacity $Q_{HC}$ of the high clutch H/C drops. The engine speed increases at a controlled quick rate because the torque transmitting capacity $Q_{HC}$ drops at a controlled rate after the initial reduction until the completion of inertia phase (moment $t_3$). The profile of the torque transmitting capacity $Q_{HC}$ during the intermediate steps 1 and 2 as illustrated in FIG. 9 has been established because torque transmitting capacity $Q_{BB}$ remains zero until the completion of inertia phase. This causes a reduction of transmission output shaft torque $T_o$ at a single controlled ramp rate until the completion of the inertia phase.

Drop in magnitude of high clutch pressure $P_{HC}$ over the intermediate stages 1 and 2 causes the high clutch H/C to be released quickly as readily seen from the profile of the high clutch torque transmitting capacity $Q_{HC}$. This causes a reduction in time required for inertia phase (between $t_1$ and $t_3$). This reduction causes a reduction in the overall time until the completion of the downshift.

The reduced orifice size of the variable orifice configuration can maintain the servo release pressure $P_{3R}$ high enough to retard application of the intermediate brake B/B until the completion of inertia phase (moment $t_3$) as readily seen from the profile of the intermediate brake torque transmitting capacity $Q_{BB}$. Thus, any tendency toward interlocking of the high clutch H/C and intermediate brake B/B can be avoided. This prevents an unnecessary drop caused by the tendency toward the interlocking state (as designated at α1 in FIG. 11) and provides the drop of the transmission output shaft torque $T_o$ at the single ramp rate as designated at α2 in FIG. 9.

The retard of the application of the intermediate brake B/B beyond the moment $t_3$ is prevented by a rapid drop in servo release pressure $P_{3R}$ upon initiation of the intermediate stage 3.

FIG. 6 illustrates the position of accumulator piston 66a, intermediate servo piston 8, timing valve spool 48b and solenoid 60 at the initiation of the intermediate stage 3. The intermediate stage 3 is initiated upon or immediately after the completion of inertia phase at the moment $t_3$ by deactivating the solenoid 60 to open the orifice 48f, thereby to restore the variable orifice configuration to the unreduced orifice size. At the beginning of this intermediate stage 3, the servo release pressure $P_{3R}$ drops quickly through the unreduced orifice size of the variable orifice configuration to cause a rapid rise in intermediate brake torque transmitting capacity $Q_{BB}$. This prevents any delay in application of the intermediate brake B/B, initiating application of the intermediate brake B/B at the moment $t_3$ upon the completion of inertia phase.

The fact that the intermediate brake B/B is applied upon the completion of inertia phase prevents engine race at a portion designated at γ2 in FIG. 9.

Turning back to FIG. 6, the accumulator piston 66a moves against the accumulator piston 66b under the bias of the line pressure until the accumulator piston 66a comes to an end of its movement during the intermediate stage 3. At the initiation of the intermediate stage 3, a quick release of oil from the intermediate servo release chamber 3S/R is assured by the unreduced orifice size of the variable orifice configuration. Concurrently, a fast increase in high clutch pressure $P_{HC}$ is assured due to the relationship that the orifice size of the orifice 120 is greater than the unreduced orifice size of the variable orifice configuration.

After a drop due to the fast release of oil, the intermediate servo release pressure $P_{3R}$ drops at an accumulator dependent ramp rate, providing the profile of intermediate brake torque transmitting capacity $Q_{BB}$ during the intermediate stage 3 as illustrated in FIG. 9.

Upon the initiation of the intermediate stage 3, the high clutch pressure $P_{HC}$ increases to a level high enough to cause the high clutch H/C to drag. The profile of the high clutch torque transmitting capacity $Q_{HC}$ is elevated to a level that has been increased by an amount δ from a broken line drawn level as illustrated in FIG. 9. This increase in capacity $Q_{HC}$ causes an increase in force with which the high clutch H/C drags.

Figure 11:
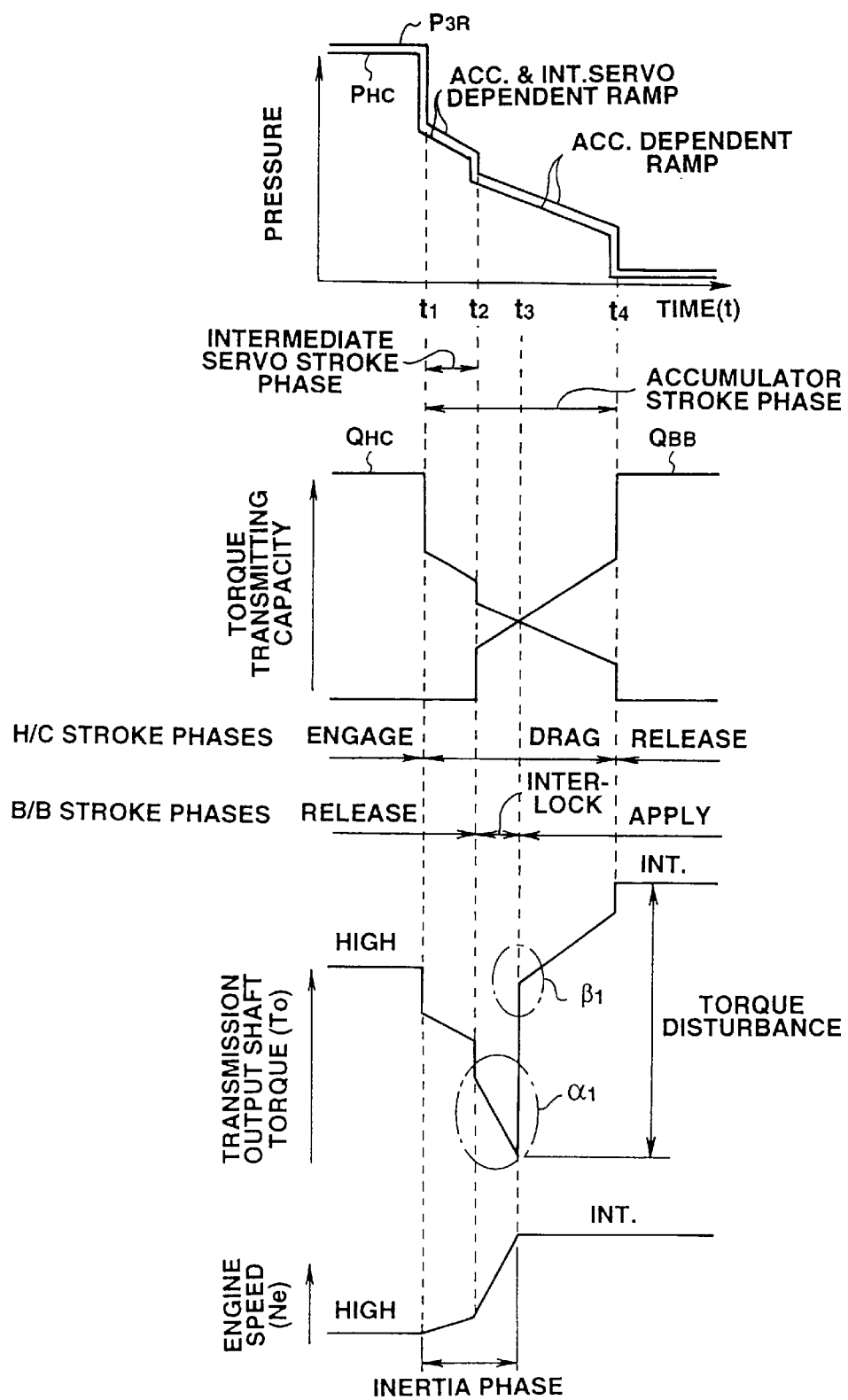
FIG. 11 illustrates a 3-2 downshift timing diagram of the known downshift control system.
Figure 12:
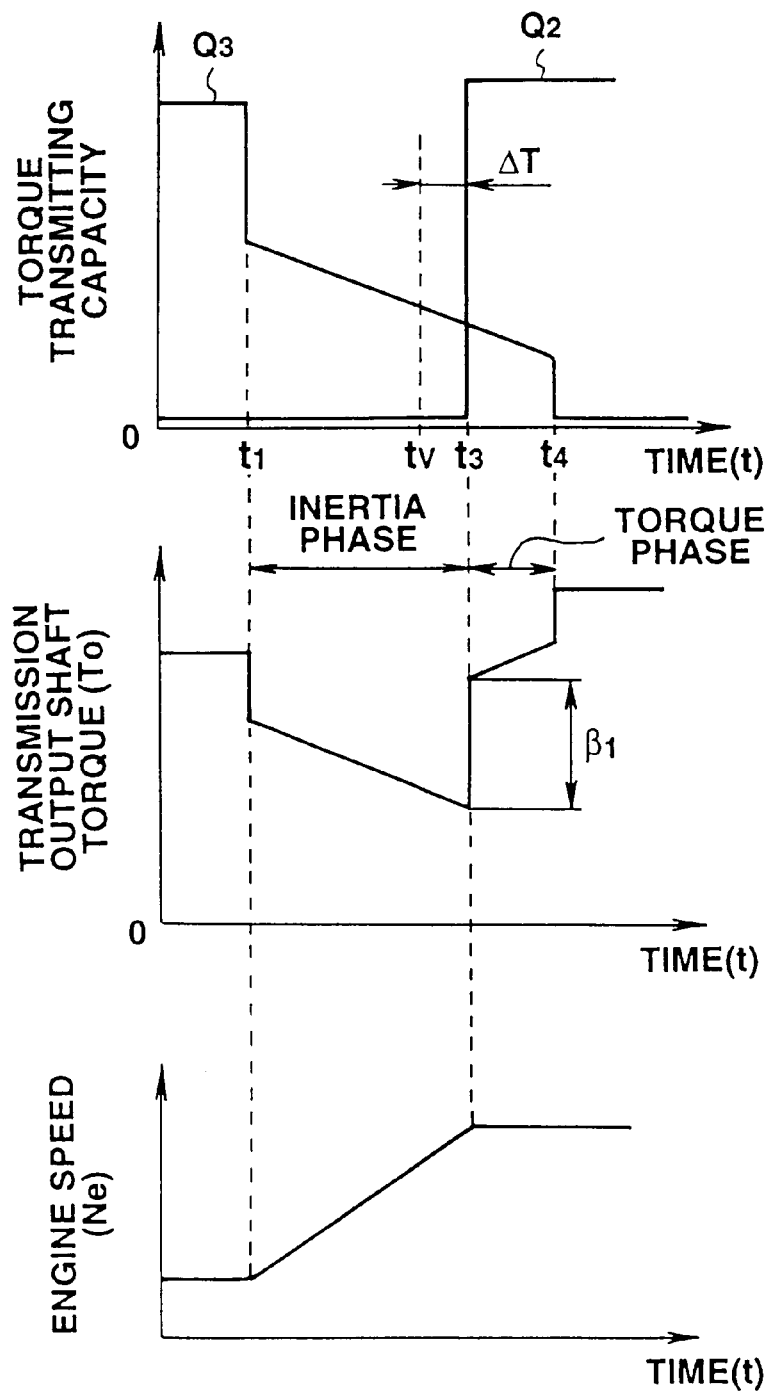
FIG. 12 illustrates a 3-2 downshift timing diagram of another known 3-2 downshift control system shown in U.S. Pat. No. 4,709,596.

The increased force with which the high clutch H/C drags is effective to suppress the profile of the transmission output shaft torque $T_o$ (as designated at β2) to a level that has been reduced by an amount ε from the broken line level as illustrated in FIG. 9. This provides minimum torque disturbance as illustrated in FIG. 9 as compared to the torque disturbance as illustrated in FIG. 11.

Figure 7:
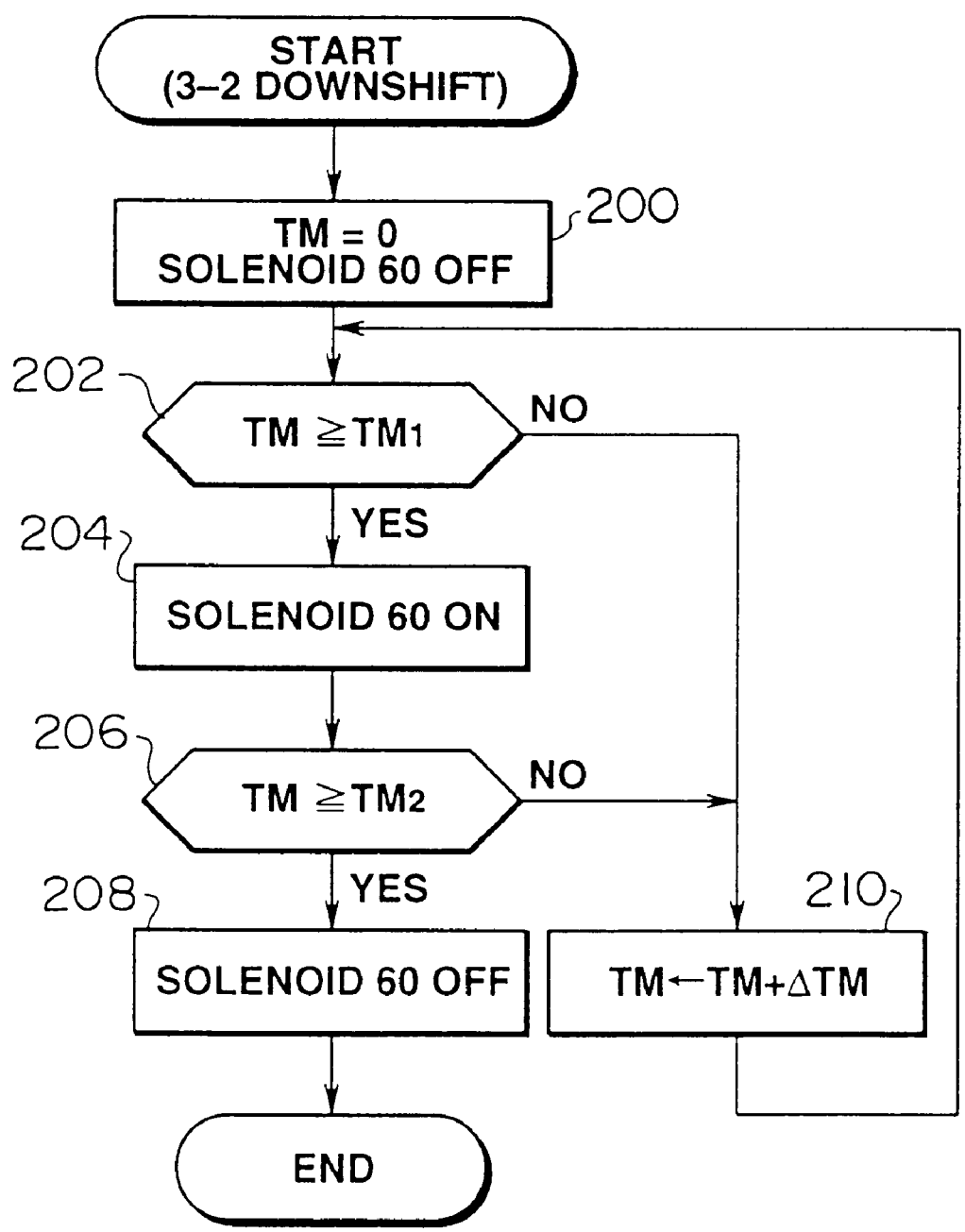
FIG. 7 is a flow diagram of a control routine for a downshift.

The flow diagram in FIG. 7 illustrates a control routine of the preferred implementation of the present invention. The execution of this control routine is initiated by the command for a 3-2 downshift. The transmission controller includes a microprocessor. At a box 200, a CPU of the microprocessor performs initialization by clearing the content of a timer TM to zero and deactivating the solenoid 60 (OFF). At the next interrogation box 202, the CPU determines whether or not the current content of the timer TM is greater than a first predetermined time $TM_1$. This first predetermined time $TM_1$ is determined and corresponds to elapse of time from the moment $t_0$ to the moment $t_1$ when the pressures $P_{HC}$ and $P_{3R}$ have dropped to cause initiation of inertia phase.

If the current content of timer TM is less than the first predetermined time $TM_1$, the CPU increases, at the next box 210, the content of the timer TM by a predetermined amount ΔTM. The content of the timer TM counts time elapsed from the 3-2 downshift command (at the moment $t_0$).

When the CPU has determined, at box 202, that the content of timer TM has become equal to or greater than the first predetermined time $TM_1$, the CPU activates, at box 204, the solenoid 60 (ON). Then, the CPU determines, at interrogation box 206, whether or not the content of the timer TM is greater than or equal to a second predetermined time $TM_2$. This second predetermined time $TM_2$ is determined and corresponds to elapse of time from the moment $t_0$ to the completion of the inertia phase at the moment $t_3$.

If the current content of timer TM is greater than the first predetermined time $TM_1$ and less than the second predetermined time $TM_2$, the CPU increases, at box 210, the content of the timer TM by the predetermined amount ΔTM. The content of the timer TM counts time elapsed from the 3-2 downshift command at the moment to until the moment $t_3$.

When the CPU has determined, at box 206, that the content of timer TM is greater than or equal to the second predetermined time $TM_2$, the CPU deactivates, at box 208, the solenoid 60.

From this control routine, it is now appreciated that the intermediate stage 1 is selected as long as the content of timer TM is less than the first predetermined time $TM_1$, the intermediate stage 2 is selected when the content of timer TM has become equal to the time $TM_1$. The intermediate stage 2 continues as long as the content of timer TM is less than the second predetermined time $TM_2$. The intermediate stage 3 is selected when the content of timer TM has become equal to the time $TM_2$. The intermediate stage 3 continues until the completion of the downshift at the moment $t_4$.

According to this time dependent downshift operations, the initiation of and the completion of inertia phase are determined upon expiration of the predetermined times $TM_1$ and $TM_2$, respectively. Thus, with a simple configuration, the inertia phase can be easily recognized.

The initiation of inertia phase may be determined by a deviation in engine speed from a level corresponding to the high ratio (at the moment $t_1$ in FIG. 9). The completion of inertia phase may be determined by an arrival in engine speed at a level corresponding to the intermediate ratio (at the moment $t_3$ in FIG. 9). This control strategy is advantageous in cost because the output of the conventional engine speed sensor can be used.

The initiation of inertia phase may be determined by a deviation in turbine speed from a level corresponding to the high ratio. The completion of inertia phase may be determined by an arrival in turbine speed at a level corresponding to the intermediate ratio. This control strategy is advantageous in accuracy because the variation of turbine speed reflects the progress of inertia phase.

Figure 8:
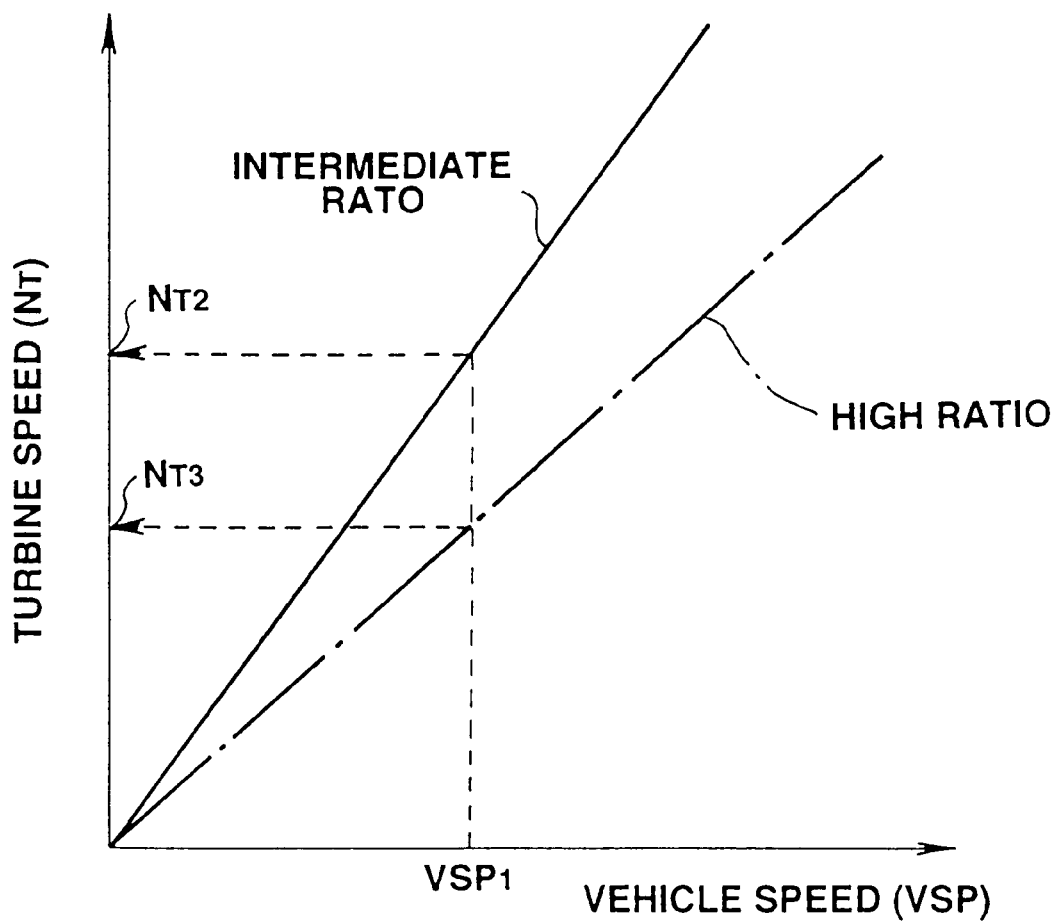
FIG. 8 illustrates turbine speed vs., vehicle speed with intermediate ratio in comparison with that with high ratio.

FIG. 8 illustrates the variation of turbine speed NT against vehicle speed VSP at intermediate speed ratio and the variation of turbine speed $N_T$ at high speed ratio. At a vehicle speed $VSP_1$, the turbine speed $N_T$ takes a value $N_{T2}$ at intermediate ratio and a value $N_T$ at high ratio. The initiation of inertia phase is determined when the turbine speed begins to increase from the value $N_{T3}$ toward the value $N_{T2}$. The completion of inertia phase is determined when the turbine speed has arrived at the value $N_{T2}$.

In the previous example, the variable orifice configuration is unreduced when the solenoid 66 is OFF and reduced when the solenoid 66 is ON. The invention is not limited to this arrangement. The variable orifice configuration may be unreduced when a solenoid is ON and reduced when the solenoid is OFF if the solenoid is of the ON drain type wherein a drain port is open when the solenoid is ON and closed when the solenoid of OFF.

From the preceding description, it will now be understood that FIGS. 4–6 illustrate a discharge circuit. This discharge circuit is responsive to the command for a downshift from a high speed ratio to an intermediate speed ratio to allow discharge oil from the intermediate brake release pressure chamber 3S/R, the high ratio clutch H/C and the accumulator chamber 66e. Also illustrated is the variable orifice configuration. This variable orifice configuration is fluidly disposed in the discharge circuit to divide the discharge circuit into an upstream part, with respect to discharge flow of oil through the discharge circuit, communicating with the accumulator chamber 66e and the intermediate brake release pressure chamber 3S/R and into a downstream part communicating with the high ratio clutch H/C. The variable orifice configuration provides different orifice sizes to control discharge flow of oil from the upstream part to the downstream part. The calibrated flow control orifice 120 is fluidly disposed in the discharge circuit to control discharge flow of oil from the downstream part.

The content of disclosure of Japanese Patent Application No. 10-37033 (filed Feb. 19, 1998) is hereby incorporated by reference in its entirety.

The above-described implementation(s) of the present invention is an example implementation. Moreover various modifications to the present invention may occur to those skilled in the art and will fall within the scope of the present invention as set forth below.

What is claimed is:

1. An automatic control system for a multiple ratio transmission in a vehicle drive line having an internal combustion engine and a hydraulic torque converter situated between the engine and an input shaft of the transmission, the transmission having a low speed ratio, an intermediate speed ratio and a high speed ratio, the automatic control system comprising:

a high speed ratio clutch connecting two torque delivery elements of the transmission to establish the high speed ratio;

an intermediate speed ratio brake providing a reaction element of the transmission to establish the intermediate speed ratio;

said intermediate speed ratio brake including a fluid pressure operated intermediate brake servo having a double acting piston defining an intermediate brake apply pressure chamber and an intermediate brake release pressure chamber;

a fluid pressure pump;

a regulator valve regulating pressure from said pump to establish line pressure;

an accumulator including an accumulator piston defining an accumulator chamber communicating with said intermediate brake release pressure chamber and said high ratio clutch;

a first shift configuration selectively distributing said line pressure to said intermediate brake apply pressure chamber;

a second shift configuration selectively distributing said line pressure to said intermediate brake release pressure chamber and said high ratio clutch, a discharge circuit being responsive to the command for a downshift from the high speed ratio to the intermediate speed ratio to allow discharge oil from said intermediate brake release pressure chamber, said high ratio clutch and said accumulator chamber;

a variable orifice configuration fluidly disposed in said discharge circuit to divide said discharge circuit into an upstream part, with respect to discharge flow of oil through said discharge circuit, communicating with said accumulator chamber and said intermediate brake release pressure chamber and a downstream part communicating with said high ratio clutch, said variable orifice configuration providing different orifice sizes to control discharge flow of oil from said upstream part to said downstream part;

a first calibrated flow control orifice fluidly disposed in said discharge circuit to control discharge flow of oil from said downstream part; and a transmission controller being operative in response to the command for a downshift from the high speed ratio to the intermediate speed ratio to reduce said variable orifice configuration to provide a reduced orifice size during inertia phase of the downshift.

2. The automatic control system as claimed in claim 1, wherein said transmission controller restores said variable flow orifice configuration to provide an unreduced orifice size upon the completion of inertia phase.

3. The automatic control system as claimed in claim 1, wherein said variable orifice configuration includes:

a pair of parallel second and third calibrated flow control orifices; and a timing valve having an open position providing passage of oil through said third calibrated flow control orifice to provide said unreduced orifice size, said timing valve having a closed position blocking passage of oil through said third calibrated flow control orifice to provide said reduced orifice size.

4. The automatic control system as claimed in claim 1, wherein said first calibrated control orifice has an orifice size less than said unreduced orifice size of said variable orifice configuration.

5. The automatic control system as claimed in claim 1, wherein said transmission controller determines the initiation of inertia phase and the completion thereof based on time elapsed from the command for downshift.

6. The automatic control system as claimed in claim 1, wherein said transmission controller determines the initiation of inertia phase and the completion thereof based on a change in engine speed from an engine speed level corresponding to the high speed ratio toward an engine speed level corresponding to the intermediate speed ratio and a change in engine speed upon reaching the engine speed level corresponding to the intermediate speed ratio.

7. The automatic control system as claimed in claim 1, wherein said transmission controller determines the initiation of inertia phase and the completion thereof based on a change in input shaft speed of the transmission from a speed level corresponding to the high ratio toward a speed level corresponding to the intermediate speed ratio and a change in the input shaft speed upon reaching the speed level corresponding to the intermediate speed ratio.

8. The automatic control system as claimed in claim 2, wherein said transmission controller is operative to hold said variable orifice configuration to provide the unreduced orifice size after the command for downshift from the high speed ratio to the intermediate speed ratio until said accumulator piston and said double acting piston are about to move.

9. An automatic control system for a multiple ratio transmission in a vehicle drive line having an internal combustion engine and a hydraulic torque converter situated between the engine and an input shaft of the transmission, the transmission having a low speed ratio, an intermediate speed ratio and a high speed ratio, the automatic control system comprising:

a high speed ratio clutch connecting two torque delivery elements of the transmission to establish the high speed ratio;

an intermediate speed ratio brake providing a reaction element of the transmission to establish the intermediate speed ratio;

said intermediate speed ratio brake including a fluid pressure operated intermediate brake servo having a double acting piston defining an intermediate brake apply pressure chamber and an intermediate brake release pressure chamber;

a fluid pressure pump;

a regulator valve regulating pressure from said pump to establish line pressure;

an accumulator including an accumulator piston defining an accumulator chamber communicating with said intermediate brake release pressure chamber and said high ratio clutch;

a first shift configuration selectively distributing said line pressure to said intermediate brake apply pressure chamber;

a second shift configuration selectively distributing said line pressure to said intermediate brake release pressure chamber and said high ratio clutch, a discharge circuit being responsive to the command for a downshift from the high speed ratio to the intermediate speed ratio to allow discharge oil from said intermediate brake release pressure chamber, said high ratio clutch and said accumulator chamber;

a variable orifice configuration fluidly disposed in said discharge circuit to divide said discharge circuit into an upstream part, with respect to discharge flow of oil through said discharge circuit, communicating with said accumulator chamber and said intermediate brake release pressure chamber and a downstream part communicating with said high ratio clutch, said variable orifice configuration providing different orifice sizes to control discharge flow of oil from said upstream part to said downstream part;

a first calibrated flow control orifice fluidly disposed in said discharge circuit to control discharge flow of oil from said downstream part; and a transmission controller being operative in response to the command for a downshift from the high speed ratio to the intermediate speed ratio to control said variable orifice configuration to establish a first intermediate stage until the initiation of inertia phase in which said variable orifice configuration provides an unreduced orifice size that is greater than the orifice size of said first calibrated flow control orifice, said transmission controller being operative to establish a second intermediate stage after the initiation of inertia phase until the completion of inertia phase in which said variable orifice configuration provides a reduced orifice size, said transmission controller being operative to establish a third intermediate stage upon the completion of inertia phase in which said variable orifice configuration provides the unreduced orifice size.

10. The automatic control system as claimed in claim 9, wherein, in said first intermediate stage, pressure within said high ratio clutch and pressure within said intermediate brake release pressure chamber drop at substantially the same rate.

11. The automatic control system as claimed in claim 10, wherein, at the initiation of said second intermediate stage, the magnitude of drop in pressure within said high ratio clutch is greater than the magnitude of drop in pressure within said intermediate brake release pressure chamber due to a change from the unreduced orifice size to the reduced orifice size.

12. The automatic control system as claimed in claim 11, wherein, in said second intermediate stage, after the initiation thereof, pressure within said high speed ratio clutch and pressure within said intermediate brake release pressure chamber drop at ramp rates that are determined by said accumulator piston and said double acting piston.

13. The automatic control system as claimed in claim 12, wherein, at the initiation of said third intermediate stage, pressure within said high speed ratio clutch increases and pressure within said intermediate brake release pressure drops.

14. The automatic control system as claimed in claim 13, wherein, in said third intermediate stage, after the initiation thereof, pressure within said high speed ratio clutch and pressure within said intermediate brake release pressure drop at ramp rates that are determined by said accumulator piston.

15. The automatic control system as claimed in claim 12, wherein torque transmitting capacity of said intermediate ratio brake continues to be zero over said first and second intermediate stages, and torque transmitting capacity of said high ratio clutch is reduced to a level low enough to accelerate the progress of inertia phase over said first and second intermediate stages.

16. The automatic control system as claimed in claim 14, wherein torque transmitting capacity of said intermediate ratio brake continues to be zero over said first and second intermediate stages, and torque transmitting capacity of said high ratio clutch is reduced to a level low enough to accelerate the progress of inertia phase over said first and second intermediate stages.

17. The automatic control system as claimed in claim 16, wherein torque transmitting capacity of said intermediate ratio brake is increased from zero to a level high enough to prevent engine race over said third intermediate stage, and torque transmitting capacity of said high ratio clutch is increased at the initiation of said third intermediate stage to a level high enough to provide increased drag against tendency of transmission output shaft to increase at the completion of inertia phase.

* * * * *